May 14, 1935.  G. J. ZIEGLER  2,001,048
CLUTCH MECHANISM
Filed June 23, 1933   2 Sheets-Sheet 1
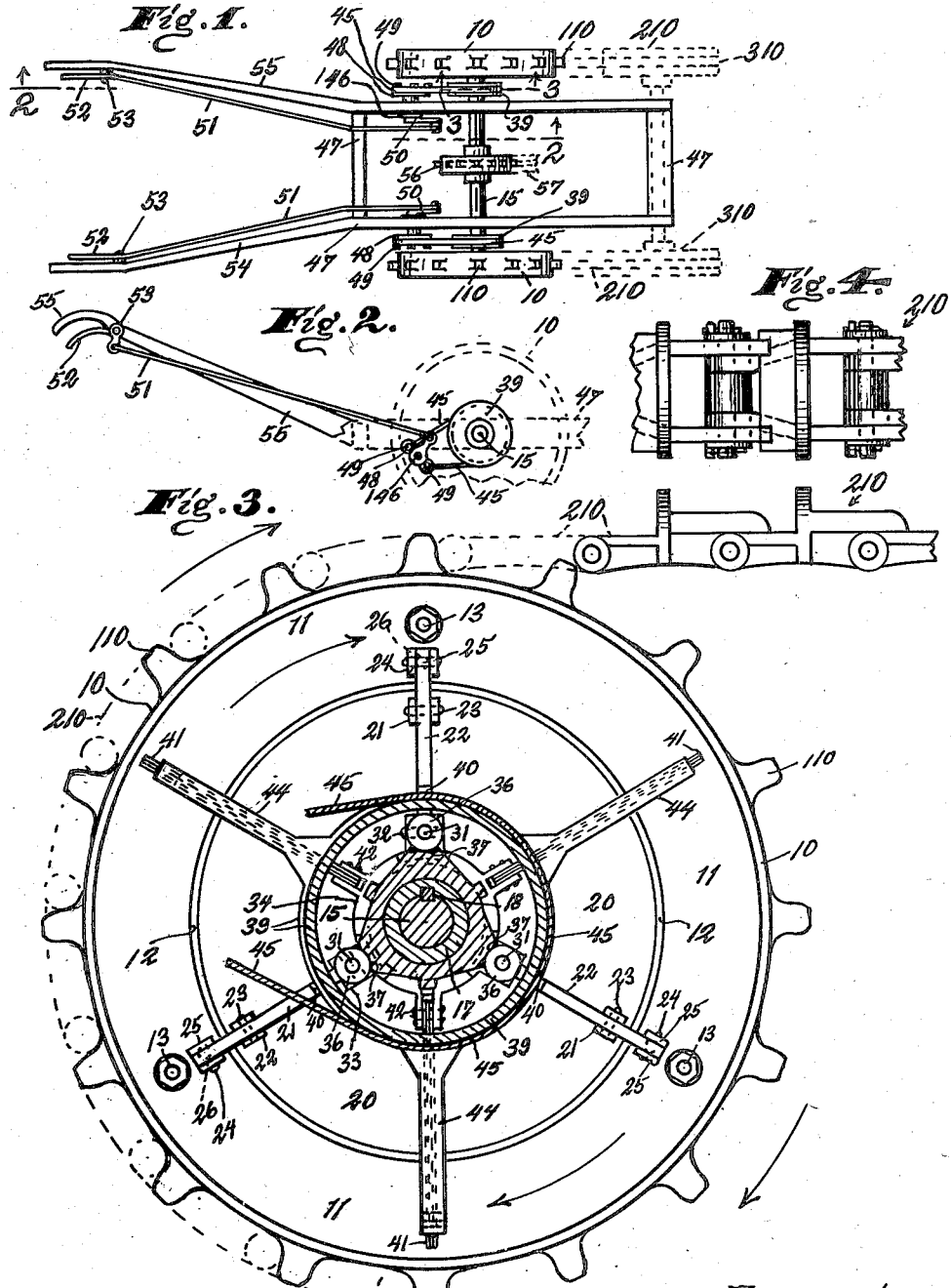
Inventor
George J. Ziegler
By
William M. Gentle
His Attorney.

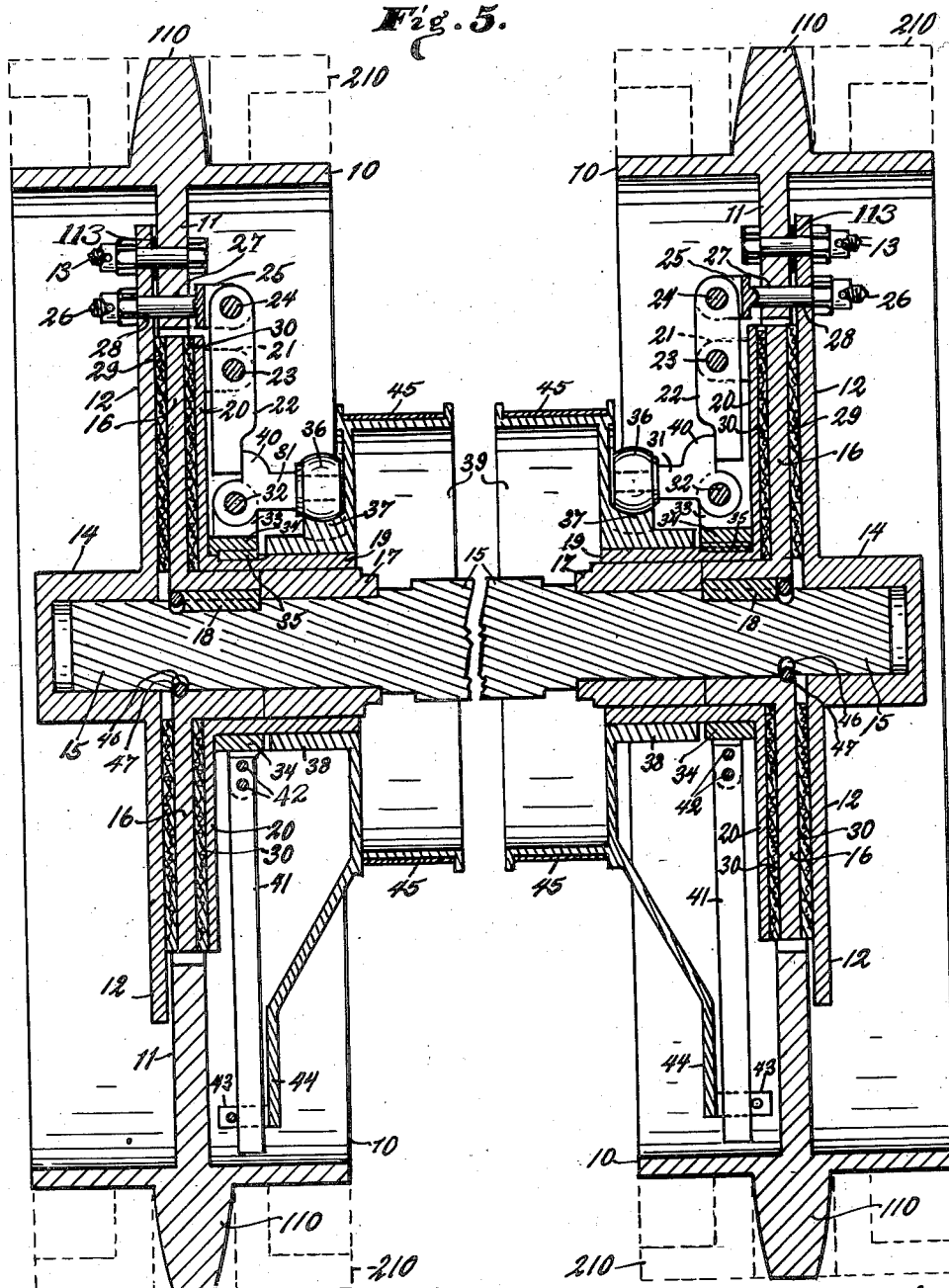

Patented May 14, 1935

2,001,048

UNITED STATES PATENT OFFICE 2,001,048

CLUTCH MECHANISM

George J. Ziegler, Los Angeles, Calif., assignor of one-half to Charles J. Heyler, Los Angeles, Calif.

Application June 23, 1933, Serial No. 677,249

6 Claims. (Cl. 192—36)

This invention relates to a clutch mechanism for a vehicle and it is an improvement of the clutch mechanism shown, described and claimed in my application for United States Letters Patent filed May 10, 1929, Serial Number 361,998, that issued June 27, 1933, Patent No. 1,915,772.

The principal object of this invention is to improve the clutch mechanism so as to materially decrease its cost of construction and also increase its efficiency and adapt it to the use of heavy duty plows and the like as well as walking tractors that in the trade are sometimes known as garden tractors.

As is well known, garden tractors are operated in a manner similar to a walking plow in which the operator walks behind the plow and guides it with its rearwardly extending handles. This garden tractor is provided with such handles but is guided by a manipulation of the clutches by means of extensions secured on the rearwardly extending handles. The handles and extensions to the clutches are not shown in detail as they are old in the art, and the extensions from the clutches are very fully described in my patent hereinbefore mentioned.

The cost of constructing this clutch mechanism is materially reduced by converting the floating member in my prior patent application hereinbefore referred to into a traction wheel of the tractor adapted to support the load and apply traction for carrying it, as well as to function as one member of the clutch. In other words the tractor is supported on oppositely arranged traction clutch wheels with intermediate means for supplying power to the driving members of the clutch mechanism which, when in frictional driving engagement with the traction wheels, cause them to turn to propel the tractor.

Another object of the invention is to provide a simple means for applying a leverage instead of a simple thrust power to the sliding clutch members to multiply their frictional engagement with the abutment members so that the tractor wheels will not inadvertently slip when subjected to great strains.

A feature of invention is shown in the construction and arrangement of the levers for applying great pressure on the clutch disks to prevent slipping when engaged for heavy duty. To that end I provide a double leverage. In the first instance thrust levers are arranged adjacent the drive shaft in position to engage the free ends of pressure levers extending radially from the drive shaft so that when actuated they force the thrust disks toward and pull the traction wheels toward the abutment disks with a leverage power.

A feature of invention is shown in the clutch mechanism by securing an abutment disk adjacent each end of the drive axel and in each clutch arranging a thrust disk adjacent the inside wall of the abutment, and the web of a traction wheel adjacent the outside thereof with leverage means for engaging them with friction disks carried by the abutment disk.

Another object is to adapt my clutch to heavy work such as drawing a very heavy disk harrow or plow.

Other objects, advantages and features of invention may appear from the accompanying drawings, the subjoined detailed description and the appended claims.

The accompanying drawings illustrate the invention in which:

Figure 1 is a diagrammatic plan view of a clutch mechanism on a small scale showing a garden tractor frame, and the means for controlling the clutches extending out on the plow handles of the tractor.

Fig. 2 is a fragmental section on the line 2—2 of Fig. 1 semi-diagrammatically showing the means for actuating the brake band on one of the clutch pulleys.

Fig. 3 is an enlarged cross section on line 3—3 of Fig. 1 showing the arrangement of the radially extending springs, levers and cams for actuating them; and also showing diagrammatically the tread chain that is preferably used with this garden tractor.

Fig. 4 is a plan view of a portion of the chain that is shown in Fig. 3.

Fig. 5 is a central vertical section through the clutch mechanism, and also showing end portions of the axle for the traction wheels in longitudinal section with the center portion broken away.

The clutch mechanism includes the traction wheels 10 which through their unusual construction and arrangement of parts form the outer members of the clutches. These wheels 10 have inner flanges 11 to which the outer disk clutch members 12 are connected by the bolts 13 and each of these clutch members 12 has a hub 14 in which the ends of the drive axle 15 are loosely mounted. Abutment disks 16, which are the center members of the clutches, have their hubs 17 secured to the axle 15 by keys 18 so they rotate with it; and loosely mounted on the hubs 17 are the hubs 19 of the thrust disks 20 that form the inner members of the clutches, and adjacent their outer rims carry the lugs 21 in which the pressure levers 22 are fulcrumed on the pins 23. Preferably there are three of these levers 22 spaced an equal distance apart around the axle 15 and extended radially therefrom.

The outer ends of these levers are pivotally connected by pins 24 to lugs 25 on the inner ends of the draw bars 26 that are extended loosely through holes 27, 28 in the inner rim portions of the flanges 11 and outer rim portions of the clutch members 12 so that when the free ends of the levers 22 are moved toward the abutment clutch member 16, the clutch member 12 will be moved against the friction disk 29 to force it into clutching engagement with the abutment clutch member 16, and also this pressure of the levers will simultaneously move the thrust clutch member 20 to force the friction disk 30 into clutching engagement with the other face of the abutment clutch member 16 to thereby clutchingly engage the clutch members so the traction wheels and axle will rotate together. Preferably rubber washers 113 are arranged around the bolts 13 between the rim 11 and the clutch member 12 so that the latter can move slightly toward the abutment clutch member 16 when there is a pull on the draw bars 26 as hereinbefore described, and as shown in Fig. 5 of the drawings.

The hubs 14 and 19 can move endwise of the shaft to engage the disks 12 and 20 with the friction disks 29, 30 carried by the abutment disks 16. In other words each clutch has a center member fixed relative to endwise movement of the shaft, and on opposite sides of the fixed member are sliding members that are moved by levers into clutching engagement with friction disks carried by the fixed member.

The inner free ends of the levers 22 are actuated by thrust levers 31 that are pivotally connected by pins 32 to lugs 33 on the annular rings 34 that are secured by keys 35 to the hubs 19. The levers 31 have rollers 36 on their reduced outer ends that are arranged to ride up on the inclined cams 37 that are integral with the hubs 38 of the clutch control pulleys 39 loosely mounted on the hubs 19; and when these rollers ride up on the cams their thrust arms 40 engage the lower free ends of the levers 22 and engage the clutch members 12, 20 with the friction disks 29, 30 carried by the abutment disks 16 so the traction wheels and axle will rotate together when the latter is driven.

The rollers 36 are normally held seated on the cams 37 by means of the radially extending springs 41 that have their inner ends secured by pins 42 to the ring 34 and their outer ends extend loosely through the guides 43 at the outer ends of the radial arms 44 that are integral with the rims of the pulleys 39.

With parts so constructed and arranged the clutch members are always engaged so that the traction wheels and drive shaft will rotate together until the rotation of the pulleys 39 is interrupted by the brake bands 45.

When the rotation of the pulleys 39 is interrupted by tightening the brake bands 45 the rotation of the radial spring arms 41 will also be interrupted at their outer ends by the arms 44 so they cause the rollers 36 to move off the cams 37 and thereby release the clutch members so the axle can continue to rotate while the traction wheels remain idle. When both of the bands 45 are tightened both traction wheels will remain idle and vice versa.

It is obvious that when only one of these bands is tightened that its respective traction wheel will be idle while the other is driven and vice versa, and by tightening one or the other of the bands 45 the tractor can be guided and turned around.

Preferably the axle 15 has annular grooves 46 adjacent the outer ends of the keys 18 in which ring springs 47 are arranged to prevent the keyed ends of the hubs 17 from creeping toward the ends of the shaft 15 when the parts are assembled.

The traction wheels 10 are provided with sprocket teeth 110 over which the tread chains 210 are extended. The construction of the chain and garden tractor forms no part of this invention and are therefore not shown or described in detail. The tread chains in the drawings are indicated by dotted lines, and, as best shown in Figs. 3 and 4, the chain links engage one another to prevent downward sagging.

The brake bands 45 are preferably actuated as illustrated in Figs. 1 and 2; but can be operated if desired as shown in my prior patent hereinbefore mentioned.

The operating means shown in Figs. 1 and 2 includes spindles 146 that are pivotally secured on opposite sides of the frame 47, and to the outer ends of these spindles eccentric bars 48 are secured. These bars are pivotally connected by pins 49 to the ends of the bands 45 so that when the spindles are turned the bars will cause the bands to grip and hold the pulleys 39 from rotating.

The spindles are rocked in their bearings for the foregoing purpose by rock arms 50 secured to the inner ends of the spindles. The outer ends of the arms 50 are connected by draw bars 51 to the hand levers 52 that are pivotally connected by pins 53 to the handles 54, 55 in position for an operator to actuate either or both of them when either or both of the tractor wheels 10 are to be stopped from rotation by releasing part or all of the clutch mechanism. The axle 15 is provided with a sprocket wheel 56 that can be connected by a chain 57 to an engine not shown. This wheel and chain are shown diagrammatically in Figs. 1 and 3.

In operation the foregoing described clutch mechanism is normally engaged so that the tractor wheels and axle rotate together and the respective clutches are disengaged by interrupting the rotation of the pulleys 39 as described.

When the rotation of the pulley on the left side is stopped the left side drive wheel will also stop so that the continued rotation of the right drive wheel will cause the apparatus to turn to the left and vice versa; and also when both pulleys are stopped both drive wheels will stop. In other words, the apparatus is controlled and guided by manipulating the pulleys as hereinbefore fully described.

I claim as my invention:

1. A clutch for a vehicle including a tractor wheel as an outer member of the clutch, an axle on which the hub of said wheel is rotatably and slidably mounted, an abutment disk forming the center member of the clutch and having an elongated hub secured to said axle, a thrust disk having a hub rotatably and slidably mounted on said elongated hub and forming the inner member of said clutch, and means including a plurality of radially extending levers pivotally mounted on said inner clutch member for moving it and the outer clutch member into engagment with friction disks carried by the abutment clutch member.

2. A clutch for a vehicle including a tractor wheel as an outer member of the clutch, an axle on which the hub of said wheel is rotatably and slidably mounted, an abutment clutch member having an elongated hub secured to said axle adjacent said wheel, a thrust clutch member having a hub rotatably and slidably mounted on said elongated hub of said abutment clutch member, means including a plurality of radially extending levers carried by said thrust clutch member for moving it and the outer member into clutching engagement with said abutment clutch member, and other means for actuating said levers.

3. A clutch for a vehicle including a tractor wheel as an outer member of the clutch, an axle on which the hub of said wheel is rotatably and slidably mounted, an abutment clutch member in the center of the clutch having an elongated hub secured to said axle, a thrust clutch member having a hub rotatably and slidably mounted on said elongated hub, friction disks arranged on opposite sides and carried by said abutment member, a plurality of radial levers pivotally mounted on said thrust clutch member that have their outer ends connected to said outer clutch member, bell crank levers operated by said axle for simultaneously actuating said movable clutch members to engage them with said friction disks, and manually operated means for releasing said clutch members from said friction disks.

4. A clutch for a vehicle including a tractor wheel as an outer member of the clutch, an axle on which the hub of said wheel is rotatably and slidably mounted, an abutment clutch member forming the center member of the clutch and having an elongated hub secured to said axle, a thrust clutch member having a hub rotatably and slidably mounted on said elongated hub and forming the inner member of said clutch, friction disks arranged on opposite sides and carried by said center member of said clutch, a plurality of radial levers pivotally connected to said thrust clutch member, draw bar connections between the outer ends of said radial levers and said outer clutch member, bell cranks operated by said axle for actuating said levers to simultaneously move said outer and inner members of said clutch into clutching engagement with said friction disks, and manually operated means for releasing said clutch members from said friction disks.

5. A clutch for a vehicle drive wheel including a hub having a socket therein, an axle having an end slidably mounted in the socket of said hub, an abutment clutch member secured to said axle adjacent said hub, a rim to said wheel, an outer clutch member integral with said hub, an inner clutch member, radial levers pivotally connected to said inner clutch member, draw bar connections between the outer ends of said levers and said outer clutch member, and means for actuating said levers to move said outer and inner clutch members toward or away from said abutment clutch member.

6. A clutch for a vehicle drive wheel including a hub having a socket therein, an axle having an end slidably mounted in the socket of said hub, an abutment clutch member secured to said axle adjacent said hub, an outer clutch member integral with said hub, a rim having an inwardly extending annular flange, an inner clutch member slidably mounted on a hub of said abutment clutch member, radial levers pivotally mounted on said inner clutch member, draw bar connections between the outer ends of said levers and said outer clutch member, said draw bars extending through the annular flange of said rim and the outer clutch member, and means for moving said levers to move said inner and outer clutch members toward and from said abutment clutch member.

GEORGE J. ZIEGLER.